US006343338B1

United States Patent
Reneris (10) Patent No.: US 6,343,338 B1
(45) Date of Patent: Jan. 29, 2002

(54) SYSTEM AND METHOD FOR SYNCHRONIZING DISPARATE PROCESSING MODES AND FOR CONTROLLING ACCESS TO SHARED RESOURCES

(75) Inventor: Kenneth S. Reneris, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/831,111

(22) Filed: Apr. 1, 1997

(51) Int. Cl.$^7$ .......................... G06F 12/00; G06F 12/14
(52) U.S. Cl. ........................................ 710/200; 712/229
(58) Field of Search ......................... 710/200; 712/223, 712/220, 229

(56) References Cited

U.S. PATENT DOCUMENTS

| | | | | |
|---|---|---|---|---|
| 5,613,139 A | * | 3/1997 | Brady | 710/200 |
| 5,734,909 A | * | 3/1998 | Bennett | 710/200 |
| 5,889,983 A | * | 3/1999 | Mittal et al. | 712/223 |
| 5,968,157 A | * | 10/1999 | Joy et al. | 710/200 |

OTHER PUBLICATIONS

Franco Travostino, "Mach3 locking protocol", pp. 1–38, Oct. 1993.*

Intel486™ Microprocessor and Related Products, pp. 2–1 through 2–0, and 2–124 through 2–143, 1995.

* cited by examiner

Primary Examiner—Zarni Maung
(74) Attorney, Agent, or Firm—Banner & Witcoff, Ltd.

(57) ABSTRACT

A system and method for synchronizing disparate processing modes and for providing mutually exclusive access to shared system resources. A processing unit operates in disparate first and second processing modes. In the first processing mode, the computer is under the control of an operating system. In the other processing mode, the computer is under the control of a system management mode interrupt handling routine. To synchronize the two processing modes and allow mutually exclusive access to shared hardware resources, the computer system includes shared memory, which contains an intermodal lock, and a mechanism for allowing each processing mode to signal the other. Before either processing mode can access the shared resource, the processing mode must attempt to acquire the intermodal lock. If the lock is acquired, the processing mode accesses the shared resource. If the lock cannot be acquired, the processing mode sets a pending bit and resumes other tasks until it receives a lock release signal from the other processing mode. When a processing mode has finished accessing the shared resource, it releases the lock and checks to see if the pending bit was set. If so, the processing mode sends a lock release signal to the other mode.

27 Claims, 4 Drawing Sheets

FIG. 2

SYSTEM AND METHOD FOR SYNCHRONIZING DISPARATE PROCESSING MODES AND FOR CONTROLLING ACCESS TO SHARED RESOURCES

TECHNICAL FIELD

The present invention relates to a system and method for synchronizing multiple processing modes in a computer, and more particularly relates to a system and method for efficiently providing mutually exclusive access to a computer resource that is shared by distinct processing modes executed by a microprocessor.

BACKGROUND OF THE INVENTION

In the operating systems and hardware that are employed in most personal computers, interrupts have traditionally been handled by the operating system. This allows the interrupt handling routines to be synchronized or coordinated with other processes that are under the control of the operating system, thereby resulting in reliable and efficient operation of the computer system. The ability to synchronize multiple processes is important regardless of whether the processes are executed on a single processor or on a multi-processor system.

Asynchronous processes are frequently synchronized by using "semaphores," which are signals or flags that govern access to shared system resources. Mutually exclusive access to a shared resource is necessary when a resource does not lend itself to shared access by multiple processes or when sharing would result in an unpredictable outcome. A "mutex" is a type of semaphore that is used to ensure that access to the shared resource is mutually exclusive, i.e., that, at any given time, only one process has access to the shared resource. A process must acquire the mutex before it can access a shared resource. Once the process is finished with the shared resource, the process "returns" the mutex so that it is available to be acquired by other processes that need to access the shared resource. A mutex may be used in the context of a locking mechanism known as a "spin lock." If the process is unable to acquire the mutex, the process simply continues to try until it is successful.

Although synchronization is very important for reliable and efficient operation, some microprocessors provide processing modes that are hidden from the operating system. For example, the "x86" architecture, which includes Intel Corporation's "PENTIUM" and "80486" microprocessors, implements a system management mode (SMM). SMM is an extremely privileged processor mode, which provides a mechanism for incorporating software controlled features that operate transparent to program modules such as the operating system and application programs. SMM is intended for use only by the computer system's firmware, not by application programs and operating system software.

In the x86 architecture, the microprocessor enters system management mode when it receives a system management interrupt (SMI). The SMM code is typically hidden from the operating system by storing it in a dedicated and secure memory space referred to as SMM RAM. The SMM RAM is used to store the SMI handler code and CPU context data. The microprocessor provides a status signal that the computer system hardware uses to decode access to the SMM RAM. An RSM instruction causes the microprocessor to exit SMM.

The SMM is transparent to the operating system and application programs for the following reasons: (1) the only way to enter SMM is by providing a non-maskable type of interrupt triggered by an external signal applied to the appropriate pin on the microprocessor; (2) the processor begins executing SMM code from a separate address space (SMM RAM); (3) upon entering SMM, the processor saves the register state of the interrupted program module in a portion of the SMM RAM; (4) upon entering SMM, all interrupts normally handled by the operating system or by applications are disabled; and (5) the RSM instruction restores processor registers from the SMM RAM and returns control to the interrupted program module.

Although processing modes such as SMM provide a mechanism for implementing power management and other features in a computer, the SMM is incompatible with the operating system and takes control of the computer away from the operating system. An SMI can stop the processor at any time, including in the middle of some instructions. The lack of synchronization and cooperation between the SMM processing mode and the operating system processing mode results in decreased reliability and efficiency. The lack of synchronization also makes it difficult for the operating system and SMM to reliably share access to the computer's resources.

In some cases, it is desirable for the SMM and operating system to share access to some hardware resources. However, prior art synchronization mechanisms are inadequate or inefficient when attempting to provide synchronization between the SMM processing mode and the operating system processing mode. For example, if the SMM processing mode fails to acquire a spin lock because the mutex is in use by the operating system, the system will fail because the SMM interrupts the operating system and prevents the operating system from completing its operation and freeing the mutex. In other locking mechanisms, a process may "announce" that it has released a lock. If this approach were used with the SMM environment, it would require that the operating system generate an SMI every time it released the mutex, in order to notify the SMM that the lock is available. Because of the overhead and problems associated with switching between the operating system environment and the SMM environment, such an approach would be highly inefficient at best.

Therefore, there is a need in the art for an efficient locking mechanism that can be used to synchronize two distinct processing modes, such as the operating system and SMM processing modes. Each processing mode should be required to acquire the lock prior to using particular resources, and to release the lock in a manner that allows efficient acquisition by the other environment.

SUMMARY OF THE INVENTION

The present invention satisfies the above-described needs by providing an intermodal locking mechanism that allows synchronization between two processing modes and that ensures mutually exclusive access to system resources that are shared by the two processing modes. In order to synchronize first and second processing modes and allow mutually exclusive access to shared resources, the computer system includes shared memory, which contains the intermodal lock, and a mechanism for allowing each processing mode to signal the other processing mode. Before either processing mode can access the shared resource, the processing mode must attempt to acquire the intermodal lock. If the intermodal lock is acquired, the processing mode may access the shared resource. If the intermodal lock is not acquired, the processing mode sets a pending bit and resumes other tasks until it receives a lock release signal from the other processing mode. When a processing mode has finished accessing the shared resource, it releases the intermodal lock and checks to see if the pending bit is set. If so, the processing mode sends a lock release signal to the other mode. This allows disparate processing modes to efficiently share a resource and ensures mutually exclusive access to the resource.

Generally described, the present invention provides a method for synchronizing first and second processing modes executed by a processing unit and for controlling access to a shared resource. The method includes providing a lock that is accessible to the first and second processing modes and which indicates the availability of access to a shared resource. The first processing mode attempts to acquire the lock. If the lock is acquired by the first processing mode, the first processing mode accesses the shared resource. The first processing mode releases the lock after accessing the shared resource from the first processing mode, and then determines the status of a pending indicator associated with the lock. If the pending indicator was set, the first processing mode sends a signal to the second processing mode.

More particularly described, the present invention attempts to acquire the lock by reading a value in a data register associated with the lock and retaining copies of the value as an original lock value and an altered lock value. An owned bit is set in the altered lock value. The first processing mode determines whether an owned bit in the original lock value is set. If so, the first processing mode sets a pending bit in the altered lock value. The first processing mode then determines whether the value in the data register associated with the lock remains equal to the value stored in the original lock value. If so, the first processing mode stores the altered lock value in the data register associated with the lock.

Still more particularly described, the present invention releases the lock by reading a value in a data register associated with the lock and retaining the read value as an original lock value and an altered lock value. The first processing mode clears an owned bit and a pending bit in the altered lock value. The first processing mode determines whether the value in the data register associated with the lock remains equal to the original lock value. If so, the first processing mode stores the altered lock value in the data register associated with the lock.

In another aspect, the present invention provides a computer system that includes a processing unit capable of executing first and second processing modes, a shared resource accessible to the first and second processing modes, and a lock for controlling access to the shared resource. The lock includes a lock data register accessible to the first and second processing modes. In response to instructions from a program module, the processing unit is operative to attempt to acquire the lock from a first processing mode. If the lock is acquired, the first processing mode accesses the shared resource. Otherwise, the first processing mode sets a pending indicator. The first processing mode releases the lock after accessing the shared resource and determines whether a pending indicator is set. If so, the processing unit sends a signal to the second processing mode.

In another aspect, the present invention provides a computer-readable medium on which is stored a computer program for synchronizing first and second processing modes executed by a processing unit and for controlling access to a shared resource. The computer program comprising instructions which, when executed by the processing unit, perform the steps of providing a lock for controlling access to the shared resource. The lock includes a register accessible to the first and second processing modes and indicates the availability of access to the shared resource. The program steps cause the first processing mode to attempt to acquire the lock. If the lock is acquired, the first processing mode accesses the shared resource. The program releases the lock after accessing the shared resource and determines the status of a pending indicator. If the pending indicator is set, the programs sends a signal to the other processing mode.

The various aspects of the present invention provide a mechanism for synchronizing processing modes to coordinate activities that run the computer. In addition, the present invention provides a mutually exclusive lock that is accessible by separate processing modes. The present invention also provides intermode communication to alert pending mode that the lock is no longer owned. The various aspects of the present invention may be more clearly understood and appreciated from a review of the following detailed description of the disclosed embodiments and by reference to the appended drawings and claims.

DETAILED DESCRIPTION AN EXEMPLARY EMBODIMENT

The present invention is directed to a system and method for synchronizing disparate processing modes and for providing mutually exclusive access to shared system resources. Generally described, an embodiment of the present invention is employed in conjunction with a computer system in which the processor operates in two disparate processing modes. In one processing mode, the computer is under the control of an operating system. In the other processing mode, the computer is under the control of the processor's system management mode interrupt handling routine. In order to synchronize the two processing modes and allow mutually exclusive access to shared hardware resources, the computer system includes shared memory, which contains the intermodal lock, and a mechanism for allowing each processing mode to signal the other. Before either processing mode can access the shared resource, the processing mode must attempt to acquire the intermodal lock. If the lock is acquired, the processing mode accesses the shared resource. If the lock cannot be acquired, the processing mode sets a pending bit and resumes other tasks until it receives a lock release signal from the other processing mode. At that point, the processing mode must again attempt to acquire the lock before accessing the shared resource. When a processing mode has finished accessing the shared resource, it releases the lock and checks to see if the pending bit was set. If so, the processing mode sends a lock release signal to the other mode. This allows disparate processing modes to efficiently share a resource and ensures mutually exclusive access to the resource.

Although an exemplary embodiment of the present invention will be generally described in the context of an operating system and other program modules running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations by conventional computer components, including a processing unit, memory storage devices for the processing unit, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process or method is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, properties, tags, types, identifiers, values, elements, symbols, characters, terms, numbers, points, records, messages, images, files, documents, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the an exemplary operating environment will be described.

AN EXEMPLARY COMPUTER SYSTEM

An intermodal lock may be used to synchronize two processing modes and ensure mutually exclusive access to shared hardware resources. This is particularly advantageous in portable, notebook-style computers in which the system management mode (SMM) may be employed to handle power management and "plug and play" functions. An intermodal lock may also be used to synchronize access to status indicators and other resources that are shared by the processing modes.

Figure 1:
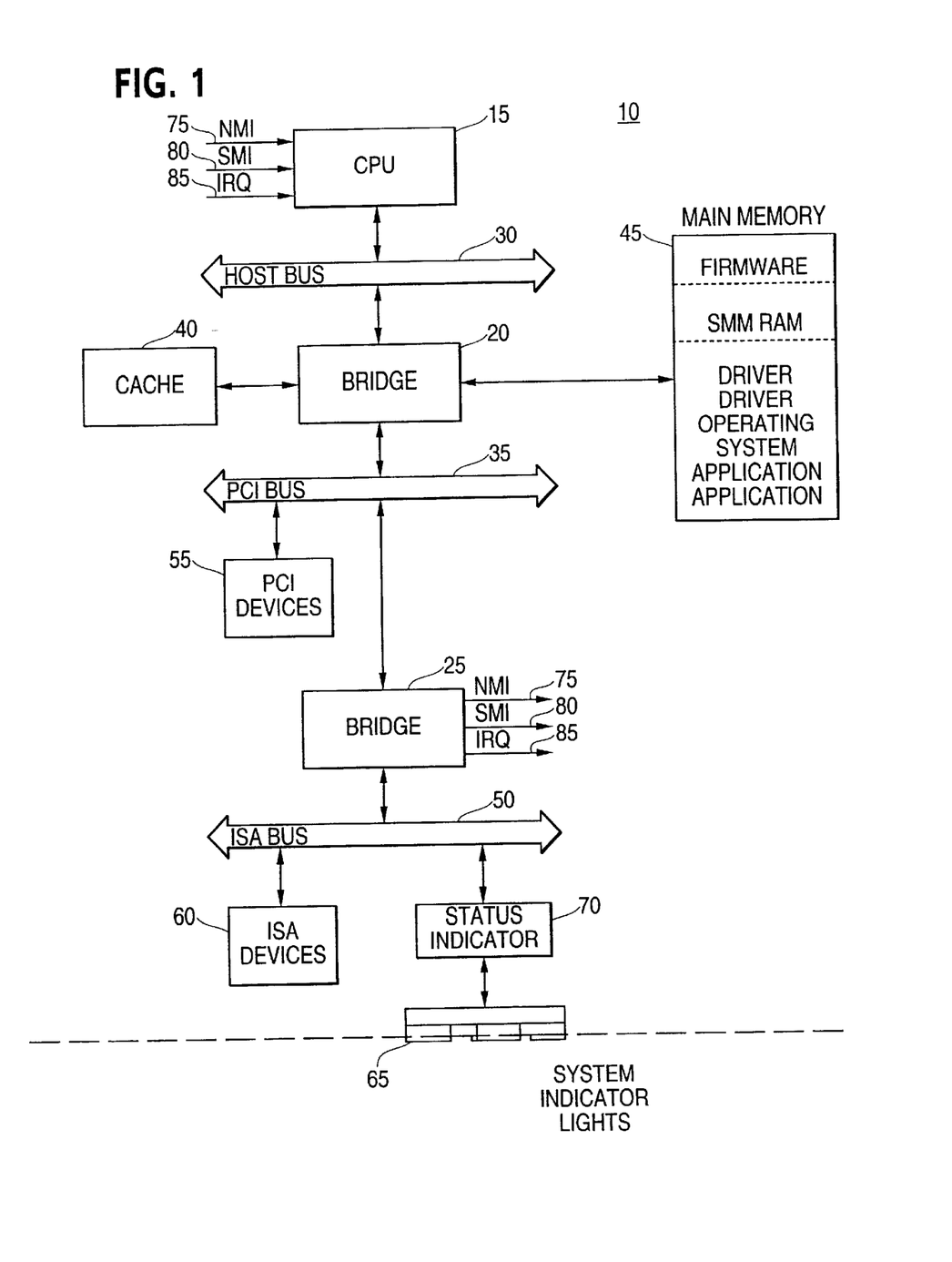
FIG. 1 is a block diagram of a computer system that provides the operating environment for an exemplary embodiment of the present invention.

FIG. 1 illustrates various components associated with a conventional personal computer 10 which is suitable for supporting the operation of an embodiment of the present invention. In an exemplary embodiment, the computer 10 includes an x86-type processing unit 15, such as the "80486" or "PENTIUM" microprocessors manufactured by Intel Corporation of Santa Clara, Calif. The computer 10 also includes a first bridge circuit 20 and a second bridge circuit 25, such as Intel Corporation's "PCISET" chip sets. The first bridge circuit 20 provides an interface between the processing unit's host bus 30, a PCI (Peripheral Components Interconnect) bus 35, cache memory 40, and main memory 45. The second bridge circuit provides an interface between the PCI bus 35 and an ISA (Industry Standard Architecture) bus 50.

The computer's main memory 45 is used to store data and program modules, such as components of the computer's firmware or BIOS, SMM RAM, device drivers, the operating system, and application programs. With respect to SMM, the firmware contains the SMM driver code and the SMM RAM contains the SMM driver data.

The first bridge circuit 20 provides a host-to-PCI bridge and provides cache control and DRAM control functions. The PCI bus 30 complies with the Peripheral Components Interconnect standard, and provides a high speed local bus for connecting one or more PCI devices 55 to the computer 10.

The second bridge circuit implements provides a bridge between the PCI bus 35 and the ISA bus 50. The ISA bus is used to connect ISA devices 60, which may include storage devices (e.g., CD-ROM drives, hard drives, floppy drives, etc.), input devices (e.g., mouse, keyboard, etc.), and output devices (e.g., video adapter, etc.).

The second bridge circuit also integrates common input/output functions found in many ISA-based computer systems. The integrated devices include DMA controllers, interrupt controllers, timer/counters, SMM power management support, and control logic for generating non-maskable interrupts. The second bridge circuit 25 may also provide the decode logic for a real time clock and keyboard controller. The second bridge circuit's interrupt logic provides a non-maskable interrupt (NMI) 75, a system management interrupt (SMI) 80, and normal interrupt requests (IRQ) 85 to the processing unit 15. These interrupt signals are provided in response to data being written to the appropriate addresses.

The system indicator lights 65 provide the user with indicators regarding system status. For purposes of this discussion, the status indicator register 70, which drives the system indicator lights 65, provides an example of a shared hardware resource that must be accessed by both the SMM and operating system processing modes. The intermodal lock allows the two processing modes to access their bits in the register without interfering with or altering the bits owned by the other process.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

A METHOD FOR CONTROLLING ACCESS TO SHARED RESOURCES

In an illustrative embodiment, the lock mechanism is referred to as an intermodal lock because it allows synchronization between two processing modes: the operating system and the processor's system management mode. The intermodal lock is a value that is stored in main memory 45 (FIG. 1). The intermodal lock DWORD can be accessed and updated by both the operating system and the SMM in a defined manner in order to provide an exclusive lock for synchronizing the operating system and SMM, and for controlling access to shared resources such as the status indicator register 70.

The intermodal lock is used to ensure that while one processing mode is accessing a shared resource, the other processing mode is not able to access the shared resource. When one processing mode needs to access the shared resource, the processing mode first attempts to acquire the intermodal lock. When an attempt to acquire the lock fails (because the lock is in use by the other processing mode), the requesting processing mode sets a pending bit within the lock, exits its attempt to acquire the lock, and waits for the other processing mode to signal that the lock has been released.

When a processing mode releases the lock, the processing mode checks to see if the pending bit was set. If so, the releasing processing mode sends a signal to the other processing mode by means of an intermodal interrupt mechanism. If the signaled processing mode still requires access to the shared resource, it would again attempt to acquire the lock. If ownership of the lock is not acquired, the processing mode must again wait for another lock release signal from the other processing mode.

The encoding of an embodiment of the intermodal lock DWORD is shown below:

| Field | Bits | Description |
| --- | --- | --- |
| Pending | 1 | non-zero (set) indicates that a request for ownership of the lock is pending |

-continued

| Field | Bits | Description |
| --- | --- | --- |
| Owned | 1 | non-zero (set) indicates that the lock is owned |
| Reserved | 30 | Reserved |

Figure 2:
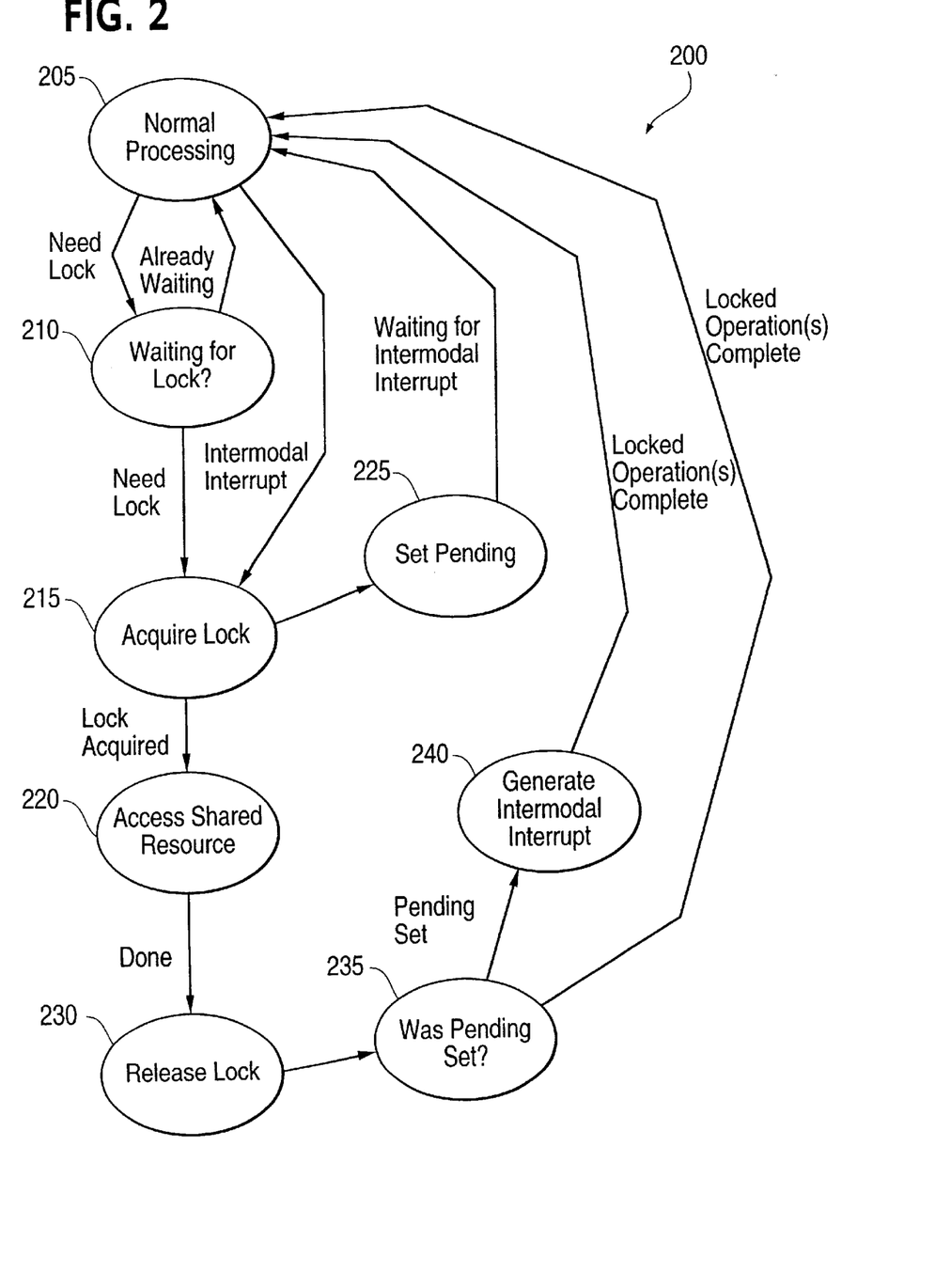
FIG. 2 is state diagram illustrating an exemplary process for acquiring the intermodal lock, accessing the shared resource, and releasing the intermodal lock.
Figure 3:
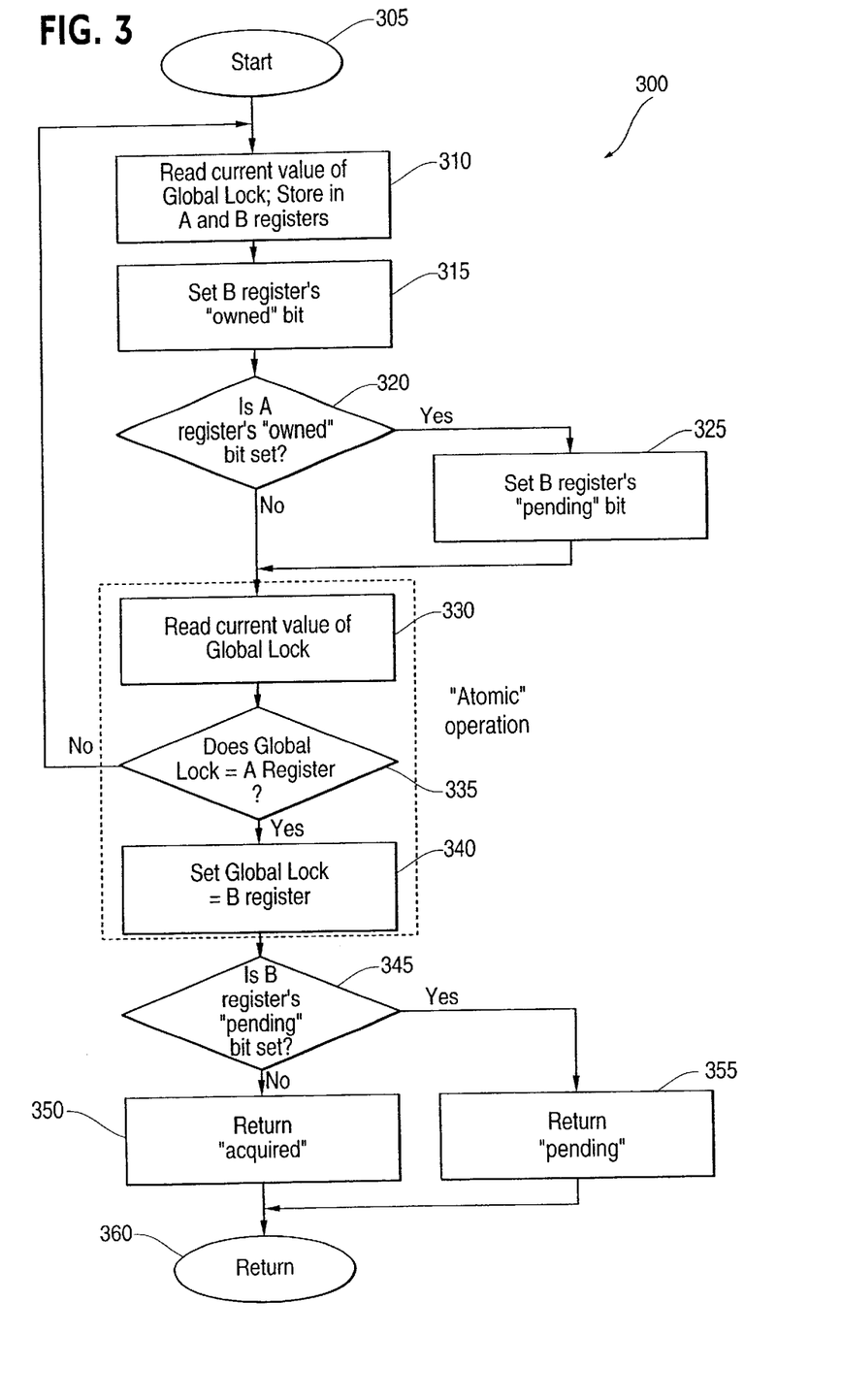
FIG. 3 is a flow diagram illustrating a method for acquiring the intermodal lock, which forms a part of the state diagram of FIG. 2.
Figure 4:
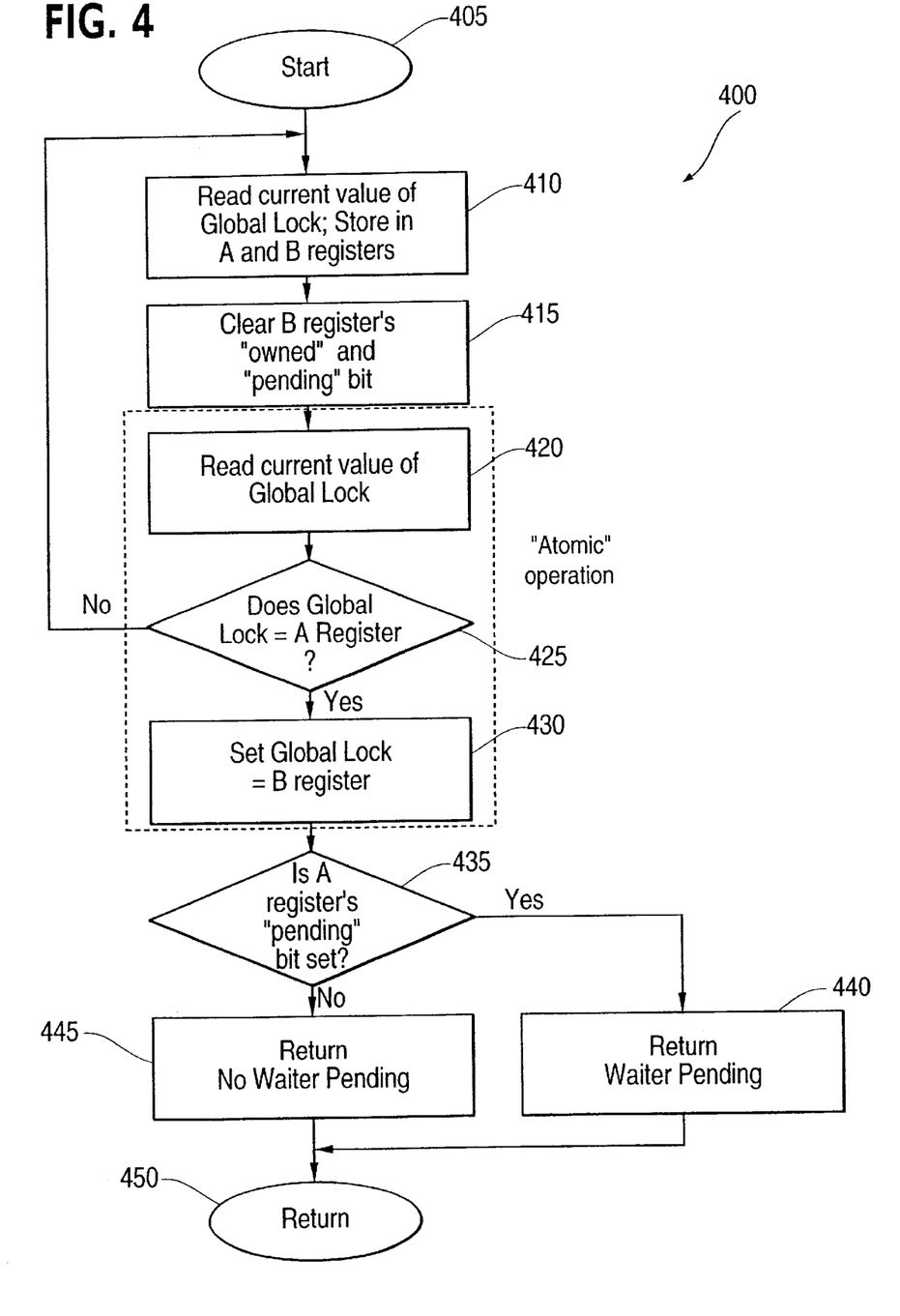
FIG. 4 is a flow diagram illustrating a method for releasing the intermodal lock, which forms a part of the state diagram of FIG. 2.

FIGS. 2–4 illustrate various aspects of the process by which a processing mode (e.g., the operating system or SMM) attempts to acquire and releases the intermodal lock when that mode is accessing the shared hardware resource. FIG. 2 is a state diagram illustrating the general process by which a processing mode attempts to acquire the intermodal lock, access the shared resource, and release the lock. FIG. 3 is a flow diagram illustrating a specific process that is employed to acquire the intermodal lock. FIG. 4 is a flow diagram of a specific process that is employed to release the lock and signal the other processing mode.

Referring now to FIG. 2, the general process 200 of acquiring, using, and releasing the intermodal lock will be described. The process begins at step 205 with the processing mode (either the operating system or the SMM) performing normal routines. In response to a determination that the processing mode needs to access a shared resource, the processing mode proceeds to state 210, where the processing mode determines whether it has already attempted to acquire the intermodal lock. If the processing mode has already attempted to acquire the intermodal lock and is waiting for the other processing mode to release the lock, the processing mode returns to state 205 and resumes normal processing. If the processing mode is not already waiting for the intermodal lock, the processing mode proceeds to state 215. Similarly, if, at state 205 the processing mode receives an intermodal lock release signal from the other processing mode and determines that it still needs the intermodal lock, the processing mode will proceed to state 215.

At state 215, an "acquire intermodal lock" routine is called. The "acquire intermodal lock" routine is described in more detail in conjunction with the flow chart of FIG. 3. If the "acquire intermodal lock" routine returns a value indicating that it has successfully acquired the lock, the method proceeds to state 220. If the "acquire intermodal lock" routine returns a value indicating that the intermodal lock was unavailable, the method sets the "pending" bit (state 225) and returns to state 205, where it resumes other processing tasks.

At state 220 the processing mode accesses the shared resource (e.g., the status indicator register 70) and performs those tasks that requires mutually exclusive access to the shared resource. When the special processing is terminated, the processing mode proceeds to state 230, where the "release intermodal lock" routine is called and the "owned" bit is cleared. At state 235 the status of the "pending" bit is determined. If the pending bit was not set by the other processing mode, the method returns to state 205 and resumes normal processing activities. If the pending bit was set by the other processing mode, the method goes to state 240 and generates an intermodal release signal or interrupt that informs the other processing mode that the lock has been released. The "release intermodal lock" routine is described in more detail in conjunction with the flow chart of FIG. 4.

At step 240 the calling processing mode sends a "release lock" signal to the other processing mode. This is accomplished by writing a predetermined value to the second bridge circuit 25, which raises the appropriate interrupt signal to the to the other processing mode. For example, if the system management mode is executing the method 200 and the "release intermodal lock routine" indicates a release signal is required, the system management mode will write a value that will cause the second bridge circuit to generate an interrupt request on the IRQ line 85 (FIG. 1). Similarly, if the operating system processing mode is executing the method 400 and the "release intermodal lock routine" indicates a release signal is required, the operating system processing mode will write a value that will cause the second bridge circuit to generate a system management interrupt on the SMI line 80 (FIG. 1).

From this general overview of the method 200, those skilled in the art will appreciate that the process of properly acquiring and releasing the intermodal lock must be performed by either of the processing modes when it needs to access the embedded controller.

FIG. 3 is a flow diagram illustrating the preferred method 300 for acquiring the intermodal lock, which was referred to above as the "acquire intermodal lock" routine. The method 300 begins at step 305 when it is called by the calling processing mode. At step 310 the current value of the intermodal lock DWORD is read from memory and stored in the processing unit's A and B registers. The A register's copy provides an original lock value, which remains intact and is used to determine the current status of the intermodal lock. The B register's copy provides an altered lock value, which is altered to indicate the revised status of the intermodal lock.

At step 315 the altered lock value's "owned" bit is set. At step 320 the process determines whether the original lock value's "owned" bit is set. If so, the method goes to step 325, where the altered lock value's "pending" bit is set.

At step 330 the current value of the intermodal lock DWORD is read and immediately compared (step 335) to the original lock value. If the values are the same, the processing mode immediately goes to step 340 and saves the altered lock value to the intermodal lock DWORD in memory. If the test fails at step 335 the method returns to step 310 and again attempts to acquire the lock.

The comparison at steps 330 and 335 is essential in order to ensure that the intermodal lock has not been acquired by the other processing mode since the value was initially read at step 310. In order to ensure that steps 330, 335, and 340 are executed without being interrupted, these steps are performed by a single "atomic" operation. In the x86 architecture, this is accomplished by using a the "lock compare exchange" processor instruction.

At step 345 the method determines whether the pending bit is set in the altered lock value. If the pending bit is not set, this indicates that the intermodal lock was not owned by the other process. In this case, the method advances to step 350 and returns a value indicating to the calling processing mode that the lock was successfully acquired. If, at step 345, the pending bit was set, this indicates that the intermodal lock is owned by the other processing mode. In this case, the method goes to step 355 and returns a value indicating to the calling processing mode that the lock was not acquired and that the pending bit has been set. At step 360, the method returns to the calling processing mode.

The following code sequence is an example of the x86 assembly code that may be used by the operating system and the SMM firmware to acquire ownership of the intermodal lock. If non-zero is returned by the function, the calling processing mode has been granted ownership of the intermodal lock and may proceed to access the shared resource. If zero is returned by the function, the calling processing mode has not been granted ownership of the intermodal lock, the "pending" bit has been set, and the calling processing mode must wait until it is signaled (via an interrupt event) that the lock is available before attempting to acquire ownership again.

```
AcquireLock:
               mov   ecx,   Lock            ; ecx = address of lock
acq10:         mov   eax,   [ecx]           ; Value to compare against
               mov   edx,   eax
               and   edx,   not 1
               bts   edx,   1               ; Check and set owner bit
               adc   edx,   0               ; if owned, set pending bit
lock compxchg dword ptr[ecx], edx           ; Attempt to set new value
               jnz   short acq10            ; If not set, try again
               cmp   dl,    3               ; Was it acquired or marked
                                            ; pending?
               sbb   eax,   eax             ; acquired = -1, pending = 0
               ret
```

FIG. 4 is a flow diagram illustrating the preferred method 400 for releasing the intermodal lock, which was referred to above as the "release intermodal lock" routine. The method 400 begins at step 405 when it is called by the calling processing mode. At step 410 the current value of the intermodal lock DWORD is read from memory and stored in the processing unit's A and B registers as an original lock value and altered lock value, respectively. As above, the A register's original lock value remains intact and is used to determine the current status of the intermodal lock. Likewise, the B register's altered lock value is altered to indicate the revised status of the intermodal lock.

At step 415 the altered lock value's "owned" and "pending" bits are cleared.

At step 420 the current value of the intermodal lock DWORD is read and immediately compared (step 425) to the original lock value. If the values are the same, the method immediately goes to step 430 and saves the altered lock value to the intermodal lock DWORD in memory. If the test fails at step 425 the method returns to step 410 and again attempts to release the lock.

As in the case of acquiring the intermodal lock, the comparison at steps 420 and 425 is essential in order to ensure that the intermodal lock has been acquired by the other processing mode since the value was initially read at step 410. In order to ensure that steps 420, 425, and 430 are executed without being interrupted, these steps are performed by a single "atomic" operation. In the x86 architecture, this is accomplished by using a the "lock compare exchange" processor instruction.

At step 435 the method determines whether the altered lock value's pending bit is set. If the pending bit is not set, this indicates that the other processing mode is not waiting to acquire the intermodal lock. In that case, the method 400 proceeds to step 445 and prepares to return to the calling processing mode a value that indicates that no other process is waiting for the lock. If at step 435 the pending bit is set, this indicates that the other processing mode is waiting to acquire the intermodal lock. In this case, the method goes to step 440 and prepares to return to the calling processing mode a value indicating that the other processing mode is waiting to acquire the lock. At step 450 the method 400 returns to the calling processing mode.

The following code sequence is an example of the x86 assembly code that may be used by the operating system and the SMM firmware to release ownership of the intermodal lock. If non-zero is returned by the function, the calling processing mode must send a "release lock" signal to the other processing mode. This indicates to the other processing mode that the intermodal lock is now likely to be free.

```
ReleaseLock:
            mov    ecx,   Lock        ; ecx = address of lock
rel10:      mov    eax,   [ecx]       ; Value to compare against
            mov    edx,   eax
            and    edx,   not 03h     ; clear owner and pending
                                      ;   field
lock compxchg dword ptr[ecx], edx     ; Attempt to set it
            jnz    short  rel10       ; If not set, try again
            and    eax,   1           ; Was pending set?
            ret
```

SUMMARY OF THE DETAILED DESCRIPTION

From the foregoing description, it will be appreciated that the present invention provides an improved system and method for synchronizing disparate processing modes and for controlling shared access to hardware resources. An exemplary embodiment of the present invention is embodied in a personal computer that employs the Intel "80486" or "PENTIUM" microprocessors, which implement the x86 architecture and its system management mode. By implementing the interface described herein, the operating system and system management modes are able to synchronize with each other and provide mutually exclusive access to shared hardware resources. In addition to providing synchronization, the present invention provides a way to realize that the other processing mode is desiring access to the lock when releasing it. The release mechanism maintains system performance by allowing the processing mode to continue to perform other processing tasks while waiting to acquire the lock. Similarly, the release mechanism conserves system resources by only announcing the release when the other processing mode is waiting for the intermodal lock.

Although using the intermodal lock allows various hardware resources to be shared, those skilled in the art will appreciate that its use could entail a significant amount of system overhead as well as waits for indeterminate amounts of time to acquire ownership of the intermodal lock. For this reason, implementations of the present invention should try to design the hardware to keep the required usage of the intermodal lock to a minimum. For example, the intermodal lock is required when a logical register in the hardware is shared. If bit 0 of a register is used by the operating system processing mode and bit 1 of the same register is used by SMM processing mode, then access to that register should be protected under the intermodal lock. Similarly, if the entire register is shared, as may be the case for an embedded controller interface, access to the register should be protected under the intermodal lock.

The foregoing system may conveniently be implemented in a program module or program that is based upon the interfaces described herein and the state and flow diagrams of FIGS. 2–4. No particular programming language has been described for carrying out most of the procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Moreover, although the present invention has been described as using the intermodal lock to protect a single shared register, the techniques described herein may be applied to protect multiple registers. Similar, although the described embodiment includes an x86-based processor, the present invention can be implemented in any computer system that employs two or more processing modes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for synchronizing first and second processing modes executed by a processing unit and for controlling access to a shared resource, comprising the steps of:

providing a lock for controlling access to the shared resource, the lock being accessible to the first and second processing modes;

attempting, from the first processing mode, to acquire the lock;

if the lock is acquired by the first processing mode, accessing the shared resource from the first processing mode;

releasing the lock after accessing the shared resource from the first processing mode;

determining whether the second processing mode has requested the lock; and if the second processing mode has requested the lock, sending a release signal from the first processing mode to the second processing mode and attempting from the second processing mode, to retry to acquire the lock after receiving the signal.

2. The method recited in claim 1, further comprising the steps of:

if the lock is not acquired by the first processing mode, setting a pending indicator; and in response to a signal from the second processing mode, again attempting to acquire the lock from the first processing mode.

3. The method recited in claim 2, wherein the signal from the second processing mode is sent to the first processing mode in response to the pending indicator being set by the first processing mode.

4. The method recited in claim 1, wherein the lock comprises a register accessible to the first and second processing modes.

5. The method recited in claim 1, wherein the step of attempting to acquire the lock comprises the steps of:

reading a value in a data register associated with the lock;

retaining an original lock value comprising the read value;

retaining an altered lock value comprising the read value with an owned bit set;

determining whether the original lock value's owned bit was set;

if the original lock value's owned bit was set, setting the altered lock value's pending bit;

determining whether the value in the data register remains equal to the original lock value; and if the value in the data register remains equal to the original lock value, storing the altered lock value in the data register.

6. The method recited in claim 5, wherein the steps of determining whether the value in the data register remains equal to the original lock value and storing the altered lock value in the data register constitute an atomic operation.

7. The method recited in claim 5, further comprising the step of returning, if the altered lock value's pending bit was set, a value indicating the lock was not acquired, otherwise, returning a value indicating the lock was acquired.

8. The method recited in claim 1, wherein the step of releasing the lock comprises the steps of:

reading a value in a data register associated with the lock;

retaining an original lock value comprising the read value;

retaining an altered lock value comprising the read value with the owned bit and pending bit cleared;

determining whether the value in the data register remains equal to the original lock value; and if the value in the data register remains equal to the original lock value, storing the altered lock value in the data register.

9. The method recited in claim 8, wherein the steps of determining whether the value in the data register remains equal to the original lock value and storing the altered lock value in the data register constitute an atomic operation.

10. The method recited in claim 1, wherein the step of sending a release signal to the second processing mode comprises generating an interrupt to the second processing mode.

11. A computer system, comprising:

a processing unit capable of executing first and second processing modes;

a shared resource accessible to the first and second processing modes; and a lock for controlling access to the shared resource, the lock including a lock data register accessible to the first and second processing modes;

the processing unit, responsive to instructions from a program module running on the computer system, being operative to:

attempt, from the first processing mode, to acquire the lock;

access the shared resource from the first processing mode if the lock is acquired by the first processing mode, otherwise, set a pending indicator associated with the lock;

release the lock after accessing the shared resource from the first processing mode;

determine, after accessing the shared resource from the first processing mode, whether the second processing mode has attempted to acquire the lock; and if the second processing mode has attempted to acquire the lock, then send a signal from the first processing mode to the second processing mode and attempting, from the second processing mode, to retry to acquire the lock after receiving the signal.

12. The computer system recited in claim 11, wherein the processor is further operative to:

read a value in the lock data register;

store the value in first and second registers;

set an owned bit in the second register;

determine whether an owned bit in the first register was set;

if the owned bit in the first register was set, set a pending bit in the second register;

determine whether the value in the lock data register remains equal to the value stored in the first register; and if the value in the lock data register remains equal to the value stored in the first register, store the value in the second register in the lock data register, wherein determining whether the value in the lock data register remains equal to the value stored in the first register and storing the value from the second register in the lock data register constitute an atomic operation.

13. The computer system recited in claim 11, wherein the processor is further operative to return, if a pending bit in the second register was set, a value indicating the lock was not acquired, otherwise, to return a value indicating the lock was acquired.

14. The computer system recited in claim 11, wherein the processor is further operative to:

read a value in the lock data register;

store the value in first and second registers;

clear an owned bit in the second register;

clear a pending bit in the second register;

determine whether the value in the lock data register remains equal to the value stored in the first register; and if the value in the lock data register remains equal to the value stored in the first register, store the value in the second register in the lock data register.

15. The computer system recited in claim 11, wherein sending a signal to the second processing mode comprises generating an interrupt to the second processing mode.

16. A computer-readable medium on which is stored a computer program for synchronizing first and second processing modes executed by a processing unit and for controlling access to a shared resource, the computer program comprising instructions which, when executed by the processing unit, perform the steps of:

providing a lock for controlling access to the shared resource, the lock including a register accessible to the first and second processing modes and indicating the availability of access to the shared resource;

attempting, from the first processing mode, to acquire the lock;

if the lock is acquired by the first processing mode, accessing the shared resource from the first processing mode;

releasing the lock after accessing the shared resource from the first processing mode;

determining whether the second processing mode has attempted to acquire the lock; and if the second processing mode has attempted to acquire the lock, then sending a signal from the first processing mode to the second processing mode and attempting, from the second processing mode, to retry to acquire the lock after receiving the signal.

17. The computer-readable medium recited in claim 16, wherein the computer program further comprises instructions which, when executed by the computer, perform the steps of:

if the lock is not acquired by the first processing mode, setting a pending indicator;

sending a signal from the second processing mode to the first processing mode in response to the pending indicator being set by the first processing mode; and in response to the signal from the second processing mode, again attempting, from the first processing mode, to acquire the lock.

18. The computer-readable medium recited in claim 16, wherein attempting to acquire the lock comprises the steps of:

reading a value in the register;

retaining an original lock value comprising the read value;

retaining an altered lock value comprising the read value with an owned bit set;

determining whether the owned bit was set in the original lock value;

if the owned bit in the original lock value was set, setting a pending bit in the altered lock value;

determining whether the value in the register remains equal to the original lock value; and if the value in the register remains equal to the original lock value, storing the altered lock value in the register.

19. The computer-readable medium recited in claim 18, wherein the steps of determining whether the value in the register remains equal to the original lock value and storing the altered lock value in the register constitute an atomic operation.

20. The computer-readable medium recited in claim 18, wherein the computer program further comprises instructions which, when executed by the computer, perform the step of returning, if the altered lock value's pending bit was set, a value indicating the lock was not acquired, otherwise, returning a value indicating the lock was acquired.

21. The computer-readable medium recited in claim 16, wherein releasing the lock comprises the steps of:

reading a value in the register;

retaining an original lock value comprising the read value;

retaining an altered lock value comprising the read value with the owned bit and pending bit cleared;

determining whether the value in the register remains equal to the original lock value; and if the value in the register remains equal to the original lock value, storing the altered lock value in the register.

22. In a computer system executing first and second processes and having a shared resource and a lock for controlling access to the shared resource by the first and second processes, a method for acquiring the lock, comprising the steps of:

attempting, from the second processing mode, to acquire the lock;

reading a lock value in a data register associated with the lock, the lock value indicating an owned bit and a pending bit;

retaining an original lock value comprising the read value;

retaining an altered lock value comprising the read value with the owned bit set:

determining whether the original lock value's owned bit was set;

if the original lock value's owned bit was set, setting the altered lock value's pending bit;

performing an atomic operation including determining whether the value in the data register remains equal to the original lock value; and if the value in the data register remains equal to the original lock value, storing the altered lock value in the data register;

determining whether the pending bit is set in the altered lock; and if the pending bit is set in the altered lock, retrying to acquire the lock by the second processing mode upon receiving a release signal from the first processing mode.

23. A computer-readable medium having computer-executable instructions for performing the steps recited in claim 22.

24. A method for synchronizing first and second processing modes executed by a processing unit and for controlling access to a shared resource, comprising the steps of:

providing a lock for controlling access to the shared resource, the lock being accessible to the first and second processing modes;

attempting, from the first processing mode, to acquire the lock by performing the steps of:

reading a lock value in a data register associated with the lock, the lock value including an owned bit and a pending bit, retaining an original lock value comprising the read value, retaining an altered lock value comprising the read value with the owned bit set, determining whether the original lock value's owned bit was set, if the original lock value's owned bit was set, setting the altered lock value's pending bit, and performing an atomic operation that determines whether the value in the data register remains equal to the original lock value and stores the altered lock value in the data register if the value in the data register remains equal to the original lock value;

if the lock is acquired by the first processing mode, accessing the shared resource from the first processing mode;

releasing the lock after accessing the shared resource from the first processing mode by performing the steps of reading a value in a data register associated with the lock, retaining an original lock value comprising the read value, retaining an altered lock value comprising the read value with the owned bit and pending bit cleared, and performing an atomic operation that determines whether the value in the data register remains equal to the original lock value and stores the altered lock value in the data register if the value in the data register remains equal to the original lock value;

determining whether the second processing mode has requested the lock; and if the second processing mode has requested the lock, then sending a release signal from the first processing mode to the second processing mode and attempting, from the second processing mode, to retry to acquire the lock after receiving the signal.

25. A computer-readable medium having computer-executable instructions for performing the steps recited in claim 24.

26. In a computer system having an operating system, a method for sharing a resource between a first processing mode and a second processing mode, comprising the steps of:

from the first processing mode, attempting to acquire a lock on the resource;

accessing the resource from the first processing mode, if the lock is acquired by the first processing mode;

releasing the lock when the first processing mode has finished accessing the resource;

determining whether the second processing mode has attempted to acquire the lock; and sending a signal from the first processing mode to the second processing mode if the second processing mode has attempted to acquire the lock, wherein one of the first and second processing modes is hidden from the operating system and the other one of the first and second processing modes is not hidden from the operating system.

27. A computer readable medium comprising a set of computer executable instructions stored thereon, said computer executable instructions comprising the steps of:

from a first processing mode of a computer system, attempting to acquire a lock on a resource;

accessing the resource from the first processing mode, if the lock is acquired by the first processing mode;

releasing the lock when the first processing mode has finished accessing the resource;

determining whether a second processing mode of the computer system has attempted to acquire the lock; and sending a signal from the first processing mode to the second processing mode if the second processing mode has attempted to acquire the lock, wherein one of the first and second processing modes is hidden from an operating system of the computer system and the other one of the first and second processing modes is not hidden from the operating system.

* * * * *